(12) United States Patent
Broussard

(10) Patent No.: US 11,505,401 B1
(45) Date of Patent: Nov. 22, 2022

(54) METHOD AND APPARATUS FOR STORAGE AND TRANSPORTATION OF CARGO

(71) Applicant: Smartlift Cargo Containers, LLC, Carencro, LA (US)

(72) Inventor: Mickey Paul Broussard, Carencro, LA (US)

(*) Notice: Subject to any disclaimer, the term of this patent is extended or adjusted under 35 U.S.C. 154(b) by 0 days.

(21) Appl. No.: 16/878,705

(22) Filed: May 20, 2020

Related U.S. Application Data

(63) Continuation of application No. 15/993,152, filed on May 30, 2018, now Pat. No. 10,676,274.
(60) Provisional application No. 62/512,889, filed on May 31, 2017.

(51) Int. Cl.
| | | |
|---|---|---|
| *B65D 88/12* | (2006.01) | |
| *B65D 88/02* | (2006.01) | |
| *B65D 90/08* | (2006.01) | |
| *B65D 90/00* | (2006.01) | |
| *B63B 25/00* | (2006.01) | |

(52) U.S. Cl.
CPC .......... *B65D 88/123* (2013.01); *B63B 25/004* (2013.01); *B65D 88/022* (2013.01); *B65D 90/0026* (2013.01); *B65D 90/0033* (2013.01); *B65D 90/08* (2013.01); *B65D 2519/0097* (2013.01); *B65D 2519/00273* (2013.01); *B65D 2519/00288* (2013.01); *B65D 2519/00323* (2013.01)

(58) Field of Classification Search
CPC ............... B65D 88/123; B65D 88/022; B65D 90/0026; B65D 90/0033; B65D 90/08; B65D 2519/00273; B65D 2519/00288; B63B 25/004
USPC ................... 220/1.5; 206/595, 596, 598, 599
See application file for complete search history.

(56) References Cited

U.S. PATENT DOCUMENTS

| | | | | | |
|---|---|---|---|---|---|
| 3,797,691 | A | * | 3/1974 | Williams, Jr. ......... | B65D 19/16 220/1.5 |
| 3,910,446 | A | * | 10/1975 | Dougherty ........... | B65D 88/121 220/1.5 |
| 4,339,047 | A | * | 7/1982 | Johansson .............. | B65D 19/12 206/509 |
| 4,481,972 | A | * | 11/1984 | Stavlo .................... | B65D 19/08 108/55.1 |
| 4,619,371 | A | * | 10/1986 | Rehrig ................... | B65D 11/22 206/427 |
| 4,717,038 | A | * | 1/1988 | Anders ................. | A47J 36/022 220/640 |
| 4,836,395 | A | * | 6/1989 | Goutille ............... | B65D 88/121 220/1.5 |
| 5,156,268 | A | * | 10/1992 | Nichols ............. | B65D 77/0466 206/386 |
| 5,248,051 | A | * | 9/1993 | Yurgevich ............ | B65D 88/121 108/57.21 |

(Continued)

*Primary Examiner* — Jacob K Ackun
(74) *Attorney, Agent, or Firm* — Ted M. Anthony

(57) ABSTRACT

A stackable cargo container apparatus has a frame assembly formed by interconnected structural members, a substantially planar base, interconnecting side walls and at least one personnel access door. At least one lifting harness member of unitary or singular construction is operationally attached to the frame assembly, and permits lifting of the cargo container apparatus from its bottom and away from welds or other possible weak points. An integrated cargo weight measurement assembly permits quick and efficient determination of cargo weight placed on the planar base, and includes a digital display or other output device.

6 Claims, 6 Drawing Sheets

(56) References Cited

U.S. PATENT DOCUMENTS

| | | | | |
|---|---|---|---|---|
| 5,732,839 A * | 3/1998 | Schimmang | | E04B 1/34305 220/1.5 |
| 6,279,767 B1 * | 8/2001 | Yoon | | B65D 88/121 220/1.5 |
| 6,364,148 B1 * | 4/2002 | Neilson | | B25H 3/022 220/1.5 |
| 7,056,081 B2 * | 6/2006 | Kelly | | B65D 88/022 220/1.5 |
| 7,104,425 B2 * | 9/2006 | Le Roy | | B65D 88/128 220/1.5 |
| 7,322,480 B2 * | 1/2008 | Bragadeste | | B65D 19/20 108/51.3 |
| 7,475,796 B2 * | 1/2009 | Garton | | B65D 88/128 211/153 |
| 7,997,441 B2 * | 8/2011 | Marcel | | B65D 90/0033 220/647 |
| 2005/0145624 A1 * | 7/2005 | Minegar | | B60P 1/286 220/1.5 |
| 2006/0032850 A1 * | 2/2006 | Theriot | | B65D 88/005 220/1.5 |
| 2006/0261059 A1 * | 11/2006 | Jokinen | | B65D 90/0026 220/1.5 |
| 2007/0162360 A1 * | 7/2007 | Congram | | G06Q 10/087 705/28 |
| 2008/0105676 A1 * | 5/2008 | Park | | E05B 83/02 220/1.5 |
| 2014/0034637 A1 * | 2/2014 | Tujague, Sr. | | B65D 90/023 220/1.5 |
| 2014/0081813 A1 * | 3/2014 | Breed | | G06Q 10/087 705/28 |
| 2014/0083554 A1 * | 3/2014 | Harris | | B65G 57/02 141/1 |
| 2014/0321950 A1 * | 10/2014 | Krenek | | B65D 88/12 414/21 |
| 2015/0114877 A1 * | 4/2015 | Ness | | B65G 1/02 206/598 |
| 2017/0313269 A1 * | 11/2017 | Breed | | B60R 21/01526 |
| 2019/0120685 A1 * | 4/2019 | Kochanowski | | B65D 88/522 |

* cited by examiner

METHOD AND APPARATUS FOR STORAGE AND TRANSPORTATION OF CARGO

BACKGROUND OF THE INVENTION

1. Field of the Invention

The present invention pertains to a method and apparatus for the storage and/or shipment of cargo including, without limitation, tools, equipment and/or products used in the oil and gas and/or other industries. More particularly, the present invention pertains to a basket-type cargo container having advantages over conventional cargo baskets and/or containers. More particularly still, the present invention pertains to a basket-type container for use in storage and/or transportation of cargo including, without limitation, in onshore, offshore and/or marine environments.

2. Brief Description of the Prior Art

Numerous containers have been devised for the transportation and/or temporary storage of cargo. Such containers can include, without limitation, static baskets, production skids and/or other similar devices; said containers permit cargo to be temporarily stored, and to be transported from one location (such as, for example, a truck, dock or boat) to another location (such as, for example, an offshore platform). In many cases, such containers can be loaded with cargo, and are frequently lifted using a crane, hoist or other lifting means.

Such lifting operations can be very common during onshore, offshore or marine operations, as well as numerous other applications. By way of illustration, but not limitation, such cargo containers are frequently lifted during the loading and unloading of ships and other vessels at offshore drilling rigs, production platforms, shore base facilities and/or loading docks. During such lifting operations, containers are typically lifted using a set of slings attached to the distal end of a crane or hoist line. Such slings are, in turn, attached to pad eyes—that are welded to a basket or container—using shackles or other temporary connectors. In such cases, the entire weight and load of the container and any associated cargo is transferred and supported by said pad eyes.

In many cases, welded pad eyes can break or become disconnected from a basket or container, particularly if such welded pad eyes are required to support heavy loads on multiple lifts; over time such welds can become subject to fatigue and stress forces. A basket or container dropped from a high elevation could severely damage property, or worse, injure or kill personnel in the vicinity. Thus, minimizing or eliminating such welded pad eyes can dramatically improve safety of such lifting operations.

Additionally, during the shipment process, cargo is typically loaded into a basket or other container. Frequently, payload weight of a basket/container and associated cargo must be determined prior to lifting and/or shipping. Generally, the cargo or payload weight is determined using a conventional scale assembly, and can be difficult and/or time consuming to accurately measure. In some cases, cargo must be physically moved back and forth to a conventional scale device prior to being loaded in a basket or, alternatively, a loaded basket or other container must be physically moved to a scale device for weighing. Further, such weighing operations can be especially difficult to perform on a drilling rig or other remote location that may not have convenient or accessible scales or other weighing devices; this is particularly problematic for truck drivers, boat captains and/or aircraft cargo loading personnel who typically do not have ready access to scales. Such weighing operations can be labor and time intensive, and can divert personnel away from other critical tasks.

With conventional cargo baskets, personnel are frequently required to reach or lean over side walls from outside the basket in order to access cargo. This can cause abdominal, back and/or other straining or awkward body positioning—especially when said personnel attempt to lift cargo out of the cargo container—that can lead to injuries, property damage or other accidents.

Thus, there is a need for a cargo container apparatus that minimizes and/or eliminates the need for welded pad eyes used for lifting or otherwise supporting said cargo container. Further, said cargo container apparatus should permit payload weight to be determined without requiring use of a separate scale or weighing device, particularly during use in the field or at other remote locations, while also allowing personnel quick and efficient access to a cargo area.

SUMMARY OF THE INVENTION

In a preferred embodiment, the cargo container apparatus of the present invention comprises a basket assembly. Said basket assembly further comprises a plurality of interconnected structural members defining a frame assembly; although other configurations can be envisioned without departing from the scope of the invention, said frame assembly generally comprises a base or bottom, a substantially planar "floating" cargo deck and a plurality (typically four) interconnected side walls extending from said base/bottom to define an inner enclosure. In a preferred embodiment, said interconnected side walls are disposed in substantially perpendicular orientation relative to said base.

At least one lifting harness is operationally attached to said frame assembly. In a preferred embodiment, each lifting harness comprises a substantially U-shaped integral member of unitary or singular construction such as, for example, a single bar or elongate planar member that does not include welds, and is bent or otherwise formed to define said U-shape. Said at least one lifting harness can be positioned relative to said frame assembly in order to minimize and/or avoid any direct loading on welds, other connection points or substructures of said frame assembly, and permitting lifting of the entire structure (and any associated cargo) from beneath said cargo container apparatus.

The cargo container apparatus of the present invention further comprises an integrated cargo weight measurement assembly. In a preferred embodiment, said cargo weight measurement system comprises at least one load cell disposed beneath or otherwise operationally connected to a planar cargo deck. Said weight measurement assembly permits determination of the weight of cargo placed on said planar cargo deck, and includes a digital display or other output device.

The cargo container apparatus of the present invention is beneficially vertically stackable, thereby permitting optional reduction of footprint area when multiple containers are utilized. Further, the cargo container apparatus of the present invention can comprise at least one hinged door in one or more of said side walls to permit personnel easy access into said enclosed area. Adjustable dividers and/or posts can be installed on said planar base for convenient subdividing of said enclosed area and storage of subs or other tubular goods. Said cargo container apparatus can be safely and conveniently manipulated using a conventional forklift.

BRIEF DESCRIPTION OF THE DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
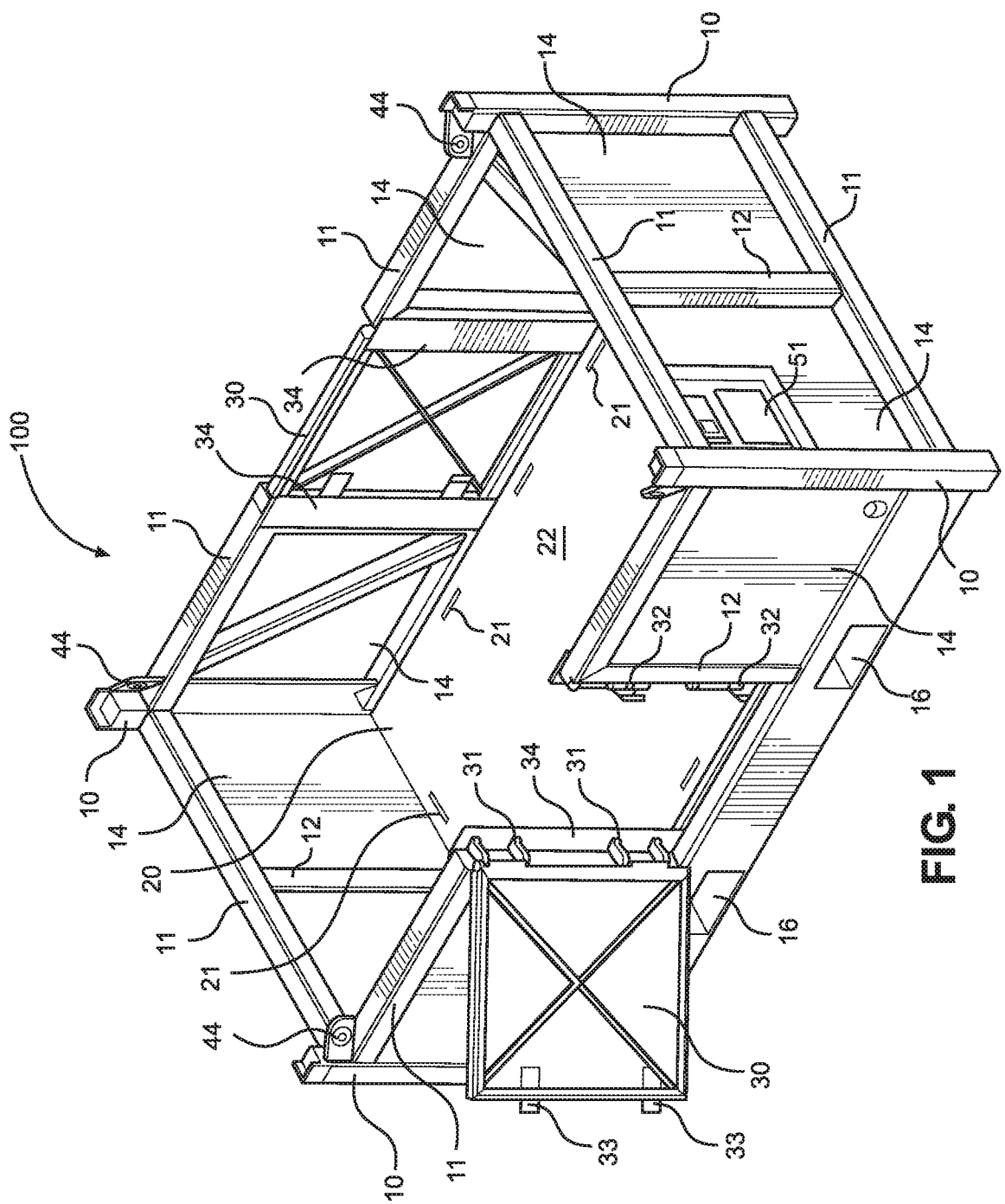
FIG. 1 depicts an overhead perspective view of a cargo container apparatus of the present invention.

FIG. 1 depicts an overhead perspective view of a cargo container 100 apparatus of the present invention. In a preferred embodiment, said cargo container apparatus 100 has the shape/configuration of a conventional basket assembly; however, it is to be observed that said shape/configuration can be altered to meet specific job parameters without departing from the scope of the present invention.

Cargo container apparatus 100 comprises a plurality of interconnected rigid structural members defining a frame assembly; although other configurations can be envisioned without departing from the scope of the invention, said frame assembly generally comprises a plurality of (typically 4) upright corner posts 10 and connecting horizontal structural members 11. Said frame assembly can also comprise vertical structural members 12 and diagonal structural members 13, as well as side-wall plate members 14. In a preferred embodiment, some or all of said rigid structural members 10 (corner posts), 11 (horizontal), 12 (vertical) and 13 (diagonal) can comprise beams and/or elongate hollow tubular members. Said tubular members can have square or other cross-sectional shapes.

Still referring to FIG. 1, cargo container apparatus 100 comprises base or bottom member 20; a substantially planar member defines a "floating" cargo deck 22 above said base member 20. Thus, it is to be observed that cargo container apparatus 100 generally comprises a base 20 and a plurality (typically four) interconnected side walls (formed by some combination of rigid structural members 10, 11, 12, 13 and/or plates 14) extending from said base 20 to define an inner enclosure area. In a preferred embodiment, said interconnected side walls are disposed in substantially perpendicular orientation relative to said cargo deck 22.

At least one opening or passageway extends through at least one side wall. At least one swingable door member 30 is disposed in said at least one opening or passageway, and is hingedly attached to a side wall of said cargo container apparatus 100 using hinges 31. Said at least one door member 30 has latch plates 33 that can be temporarily latched or locked using latch members 32 to secure said at least one door member 30 in a closed position. In a preferred embodiment, door plates 34 are disposed on both sides of each door member 30.

Said door members 30 permit quick, safe and efficient access to the enclosed area on cargo deck 22. Said door members 30 eliminate the need for personnel to reach over the side walls from the outside of cargo container 100 in order to access cargo on cargo deck 22. Rather, a user can access said cargo deck 22 (and any objects or cargo present on said cargo deck 22) directly through door members 30 in order to access cargo for attachment of lifting slings or, when appropriate, for removal of said cargo directly through open door members 30.

Figure 2:
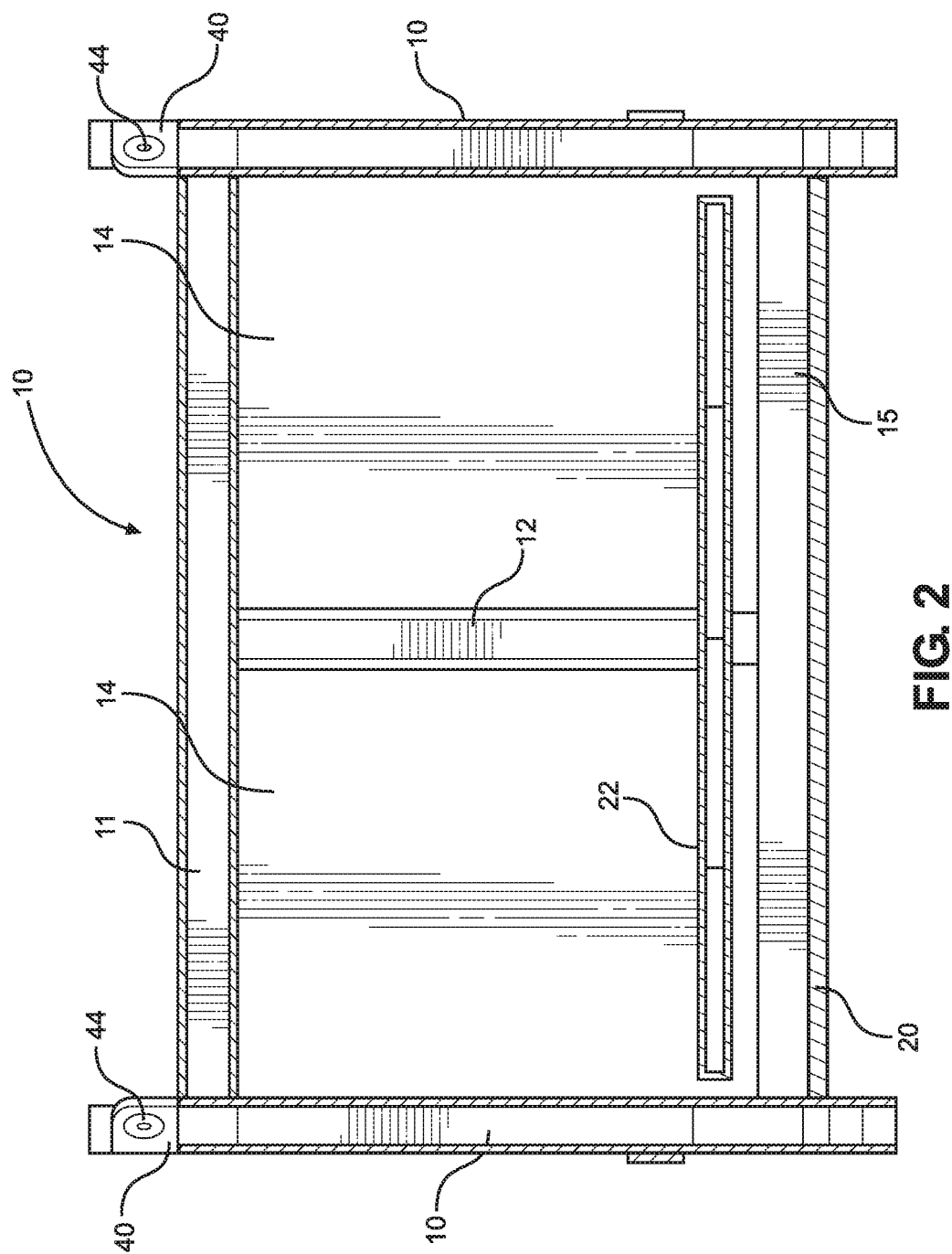
FIG. 2 depicts an end sectional view of a cargo container apparatus of the present invention.

FIG. 2 depicts an end sectional view of a cargo container apparatus 100 of the present invention. In the view depicted in FIG. 2, cargo container apparatus 100 comprises upright corner posts 10 and connecting horizontal structural members 11, as well as bottom cross members 15 (not visible in FIG. 1). Said frame assembly can also comprise vertical structural members 12, diagonal structural members 13 (not visible in FIG. 2), as well as plate members 14. Cargo container apparatus 100 further comprises a base 20, while cargo deck 22 is disposed over said base 20. A lifting harness member 40, having a reinforced aperture 44, is disposed at said corner posts 10.

Figure 3:
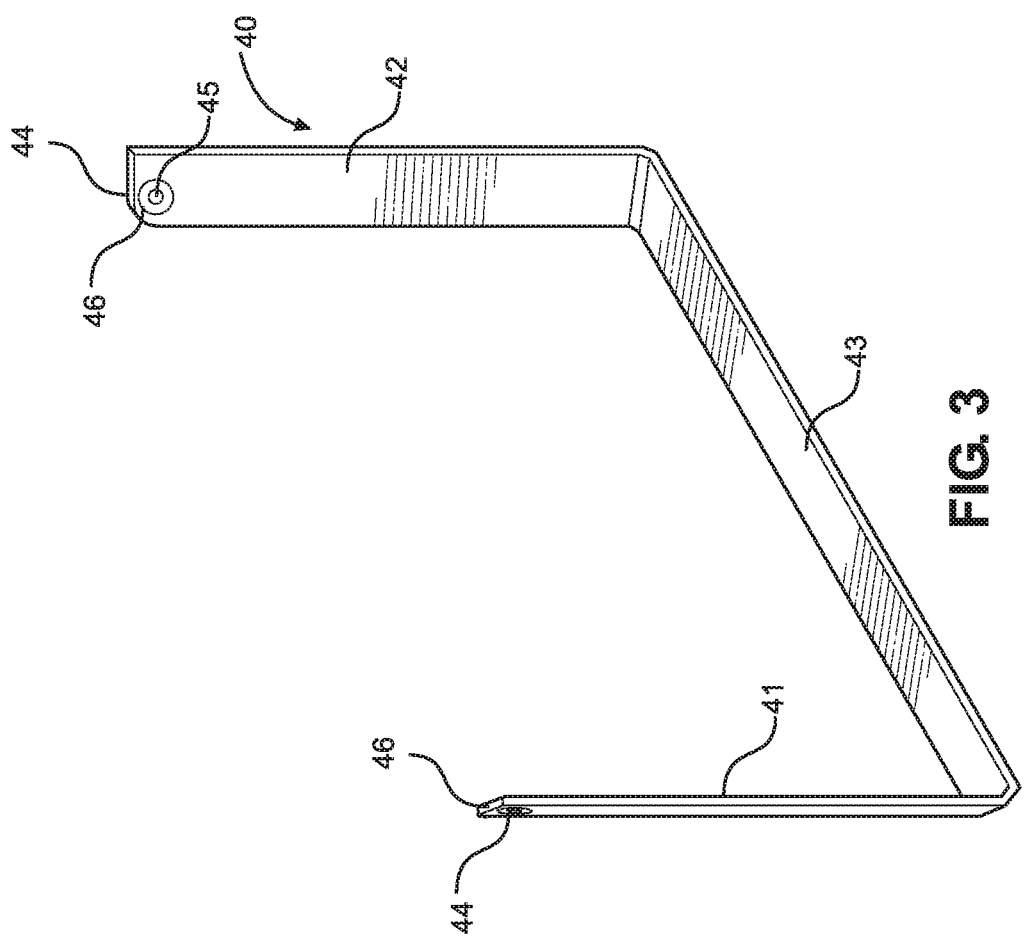
FIG. 3 depicts a side perspective view of a lifting harness of the present invention.

FIG. 3 depicts a side perspective view of a lifting harness 40 of the present invention. At least one lifting harness is operationally attached to said frame assembly of cargo container apparatus 100, as more clearly depicted in FIGS. 4 and 5. In a preferred embodiment, lifting harness 40 comprises a substantially U-shaped member of unitary or singular construction such as, for example, a single bar or elongate planar member that does not include welds, and that is bent or otherwise formed to define said shape.

In a preferred embodiment, said lifting harness 40 comprises first upright arm segment 41, second upright arm segment 42, and bottom cross segment 43 extending between upright arm segments 41 and 42. At least one aperture 44 extends through said lifting harness member 40 near the distal ends of each said first upright arm segment 41 and second upright arm segment 42. Said apertures 44 can include a surrounding ring 45 to reinforce, bolster and/or strengthen said apertures 44 against tearing or deformation, as well as curved or convex upper surface 46. Further, in a preferred embodiment, said first upright arm segment 41 and second upright arm segment 42 are not aligned or oriented parallel relative to each other, but rather are slanted inward at an angle, generally in a direction toward each other.

Figure 4:
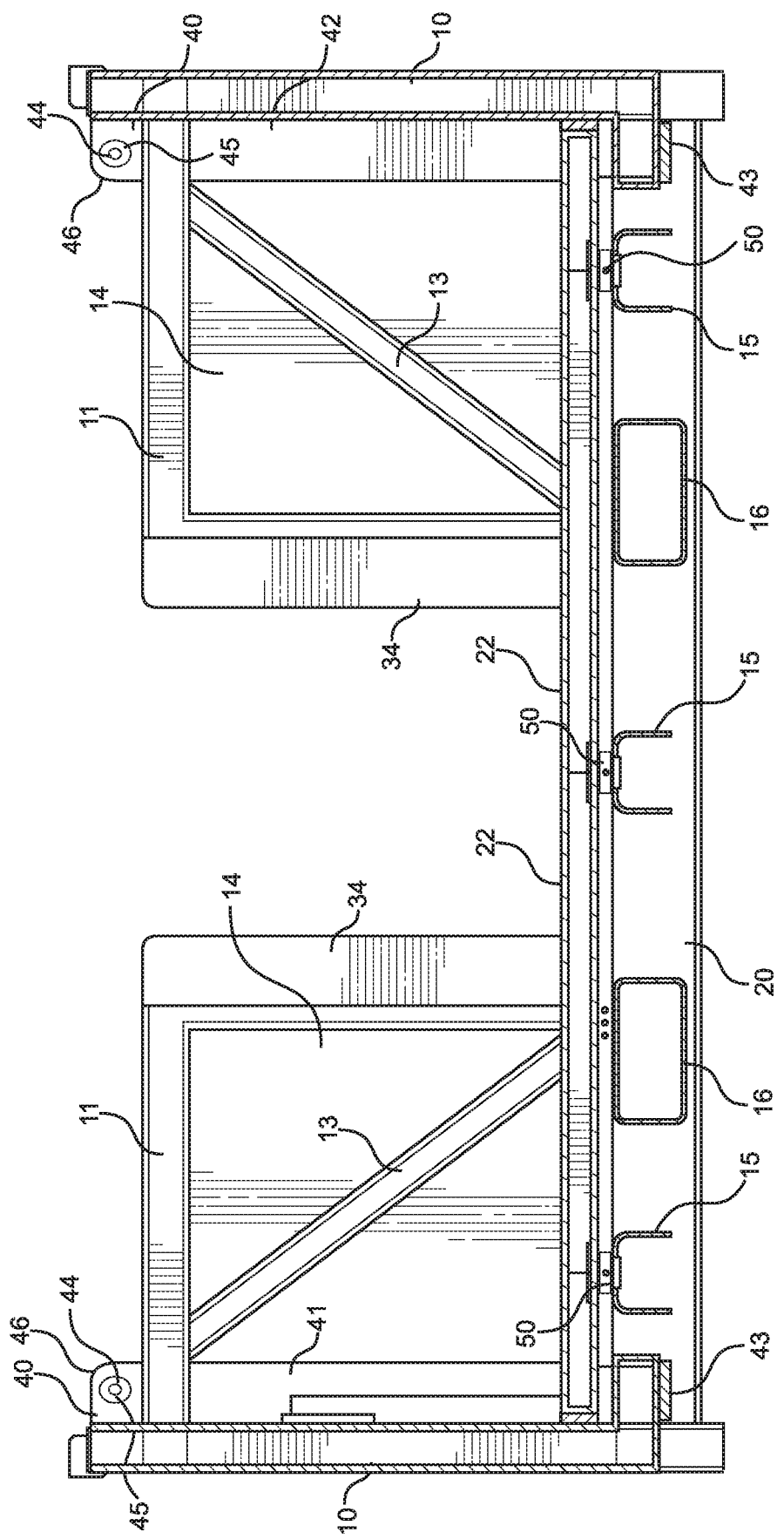
FIG. 4 depicts a side sectional view of a cargo container apparatus of the present invention.

FIG. 4 depicts a side sectional view of a cargo container apparatus 100 of the present invention comprising upright corner posts 10, horizontal structural members 11, diagonal structural members 13, and plate members 14. Cross members 15 extend from side to side across the base of cargo container apparatus 100, and provide structural support for said base 20 of said cargo container apparatus 100. A plurality of spaced apart fork lift receptacles 16 are also disposed along the base of said cargo container apparatus 100; said fork lift receptacles 16 are adapted to receive forks of a forklift when cargo container apparatus 100 is lifted or transported via forklift.

Cargo container apparatus 100 further comprises a substantially planar cargo deck 22. At least one sensor is disposed beneath or otherwise operationally connected to said cargo deck 22. In a preferred embodiment, said at least one sensor comprises load cell 50 that is disposed between cargo deck 22 and said cross members 15. Further, in a preferred embodiment, said at least one load cell 50 provides a fluid (typically hydraulic) pressure or electric signal that is communicated to an output display, such as a visual output display screen.

Said at least one load cell 50 permits determination of the weight of cargo placed on cargo deck 22. Said at least one load cell 50 is operationally linked to at least one output display (see output display screen 51 in FIG. 1), such as a digital numerical display or other output device, for displaying the weight of cargo and/or other objects disposed on said cargo deck 22. Although FIG. 1 depicts said output display 51 mounted at an end of cargo container apparatus 100, it is to be observed that said output display 51 can alternatively be located at any number of other locations on said cargo container apparatus 100 including, without limitation, at a remote location not physically connected to said cargo container 100 and linked through wireless communication.

Still referring to FIG. 4, lifting harness members 40, each having first upright arm segment 41 and second upright arm segment 42 (only one of each is lifting harness member 40 is depicted in FIG. 4), a base segment 43, and apertures 44 with reinforcing rings 45 and convex upper surfaces 46, are disposed at said corner posts 10. The geometry of each lifting harness member 40, and the placement of said lifting harness members 40 relative to said rigid frame members, ensures that loading within said cargo container 100 is lifted/supported from the base of said cargo container 100. Said lifting harness members 40 are beneficially positioned relative to said frame assembly in order to minimize and/or avoid any direct loading on welds, other connection points or substructures of said frame assembly.

Figure 5:
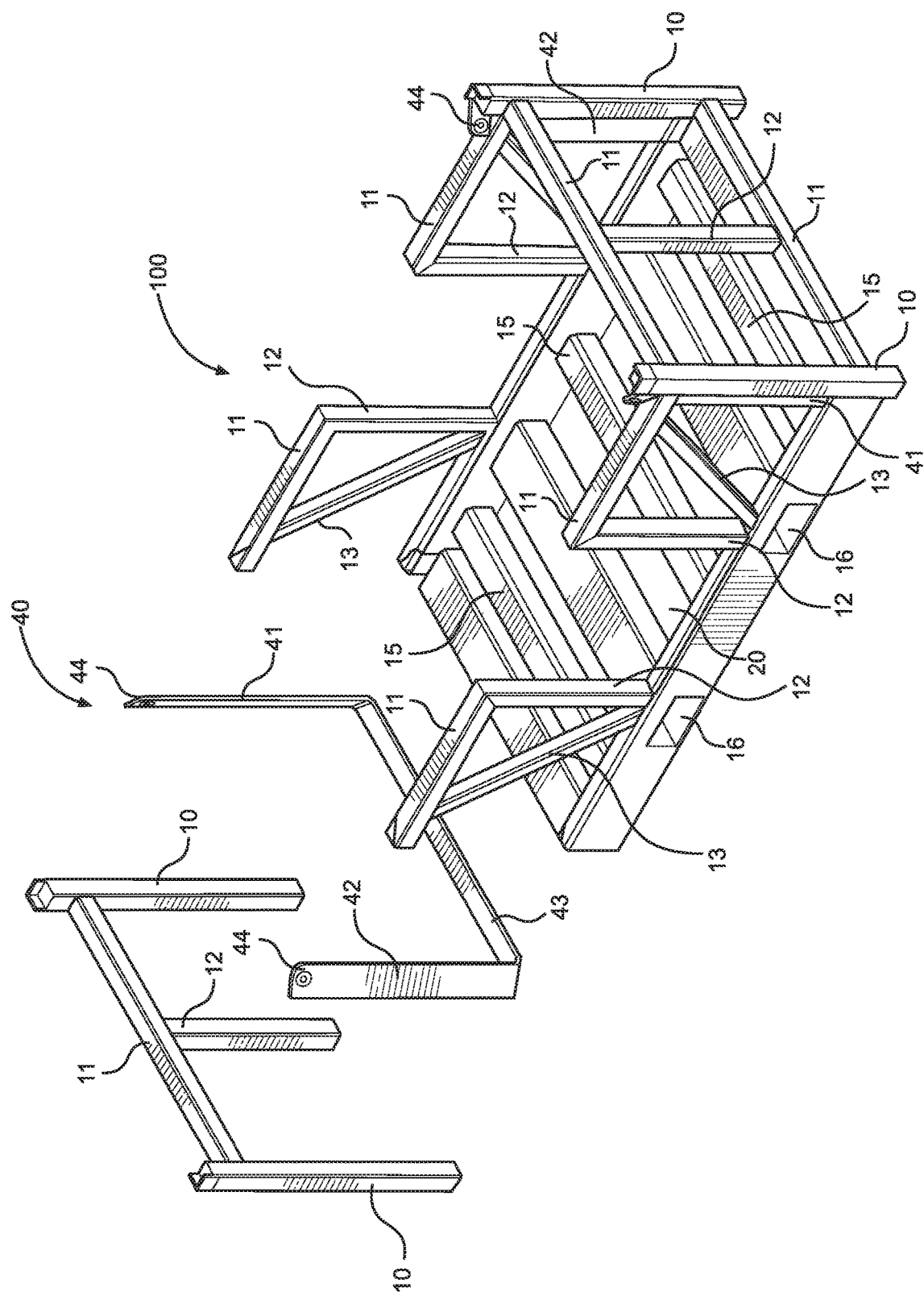
FIG. 5 depicts a partially exploded view of a cargo container apparatus of the present invention.

FIG. 5 depicts a partially exploded view of a cargo container apparatus 100 of the present invention. Cargo container apparatus 100 of the present invention comprises upright corner posts 10, horizontal structural members 11, vertical structural members 12 and diagonal structural members 13; plate members 14 are removed in FIG. 5 for clarity purposes. Cross members 15 extend from side to side across the base of cargo container apparatus 100, and provide structural support for said base 20 of said cargo container apparatus 100. A plurality of spaced apart elongate fork lift receptacles 16 are also disposed along the base of said cargo container apparatus 100; said fork lift receptacles 16 are adapted to receive forks of a forklift when cargo container apparatus 100 is lifted or transported via forklift.

Still referring to FIG. 5, lifting harness member 40 has first upright arm segment 41 and second upright arm segment 42, bottom or base segment 43, and reinforced apertures 44 at the distal (upper) ends of said upright arm segments 41 and 42. Said upright arm segments 41 and 42 are generally disposed at said corner posts 10, while bottom segment 43 extends below base member 20. The geometry of each lifting harness member 40, and the placement of each lifting harness member 40 relative to said rigid frame members of cargo container 100, ensures that loading of said cargo container 10 and any cargo within said cargo container 100 is lifted/supported from the base of said cargo container 100. Said lifting harness members 40 are beneficially positioned relative to said frame assembly in order to minimize and/or avoid any direct loading on welds, other connection points or substructures of said frame assembly.

Figure 6:
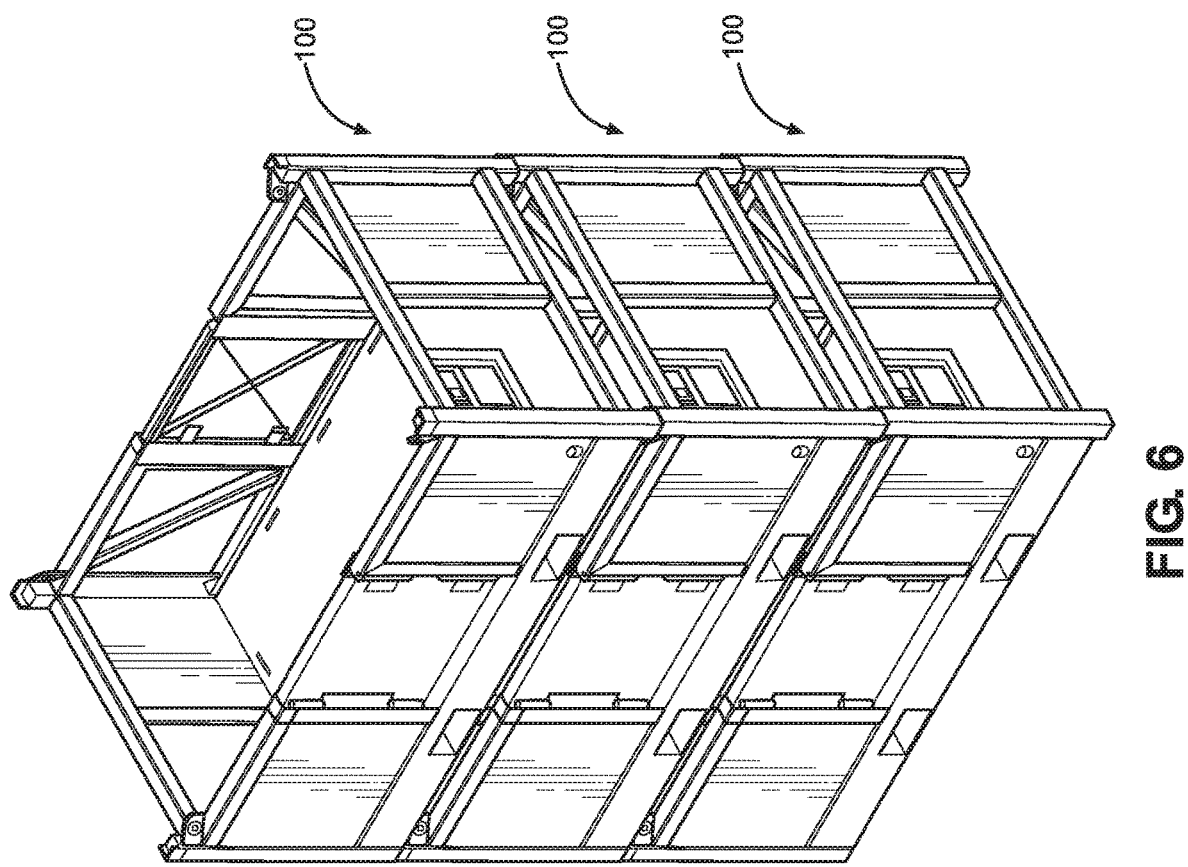
FIG. 6 depicts an overhead perspective view of a plurality of cargo container apparatuses of the present invention in a stacked configuration.

FIG. 6 depicts an overhead perspective view of a plurality of cargo container apparatuses 100 of the present invention in a vertically stacked configuration. Cargo container apparatus 100 of the present invention is beneficially vertically stackable, thereby permitting optional reduction of footprint area when multiple containers are utilized. Although not depicted in the drawings, adjustable dividers and/or posts can be optionally installed on said planar cargo deck 22 of base 20 for convenient subdividing of said enclosed area and storage of subs or other tubular goods. Referring to FIG. 1, cargo payload deck 22 includes apertures 21 comprising tie-down points for optional straps or cords for securing cargo against unwanted movement or shifting on said cargo deck 22.

In operation, slings or other lifting means can be attached to the distal end of a crane, hoist or other lifting line. Referring to FIG. 4, said slings can be secured to apertures 44 of upright arm segments lifting harness members 40 using shackles or other conventional connection means. Cargo can be selectively loaded on or off of cargo deck 22; as said cargo is loaded on and/or off of said cargo deck 22, said load cells 50 sense and determine the aggregate or combined weight of said cargo disposed on said cargo deck 22 in real time. Referring to FIG. 1, said cargo weight value can be displayed on visual display 51 without requiring any other scale or weight sensor; such information can be used to ensure or verify that said cargo does not exceed predetermined maximum weight or capacity limits of cargo container apparatus 100, lifting slings, a crane or any other component of said lifting operation such as, for example, prior to a loading or lifting operation.

As said cargo container 100 is lifted using said crane, hoist or other lifting line, all loading associated with weight of cargo container 100 and any cargo contained therein is supported by lifting harness members 40. Because bottom segments 43 of said lifting harnesses 40 extend under cargo container 100, weight associated with said cargo container 100 and cargo is lifted or supported from below said cargo container base 20 (that is, from said lifting harnesses); no weight is supported by a welded pad eye, as with conventional baskets. Because of the unitary construction of lifting harnesses 40, in the event of inadvertent overloading of cargo container 100, said lifting harnesses 40 will deform rather than part or separate, thereby ensuring that said cargo container 100 and any associated cargo on cargo deck 22 will not drop or break apart from said crane, hoist or other lifting line.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A cargo container comprising:
   a) a plurality of interconnected sides;
   b) a cargo deck positioned between said interconnected sides;
   c) at least one load cell for measuring the weight of cargo disposed on said cargo deck;
   d) slings for suspending said cargo deck and cargo from a crane or other lifting device; and
   e) a visual display for displaying weight measured by said at least one load cell, wherein said visual display is used to confirm that weight of cargo disposed on said cargo deck does not exceed a predetermined maximum load capacity of said slings.

2. The cargo container of claim 1, further comprising:
a) at least one passageway formed in at least one of said sides; and
b) a door moveably disposed in each of said at least one passageways, wherein said door is configured to alternate between a first open position and a second closed position.

3. A cargo container comprising:
a) a cargo deck having a plurality of sides and a substantially planar upper surface;
b) a plurality of side walls, wherein said plurality of side walls are disposed around said plurality of sides of said cargo deck and extend above said substantially planar upper surface of said cargo deck;
c) at least one load cell configured to measure the weight of cargo disposed loaded on said substantially planar upper surface of said cargo deck;
d) slings for suspending said cargo deck and cargo from a crane or other lifting device; and
e) a visual display for displaying weight measured by said at least one load cell, wherein said visual display is used during loading of said cargo to confirm that weight of said cargo loaded on said cargo deck does not exceed a predetermined maximum load capacity of said slings.

4. The cargo container of claim 3, further comprising:
a) at least one passageway formed in at least one of said plurality of side walls; and
b) a door moveably disposed in each of said at least one passageways, wherein said door is configured to alternate between a first open position and a second closed position.

5. The cargo container of claim 3, further comprising at least one lifting harness operationally attached to at least one of said side walls.

6. The cargo container of claim 5, wherein said lifting harness further comprises:
a) a first upright arm member;
b) a second upright arm member; and
c) a bottom member extending between said first and second upright arm members and oriented substantially perpendicular to said first and second upright arm members.

* * * * *